Figure 1:
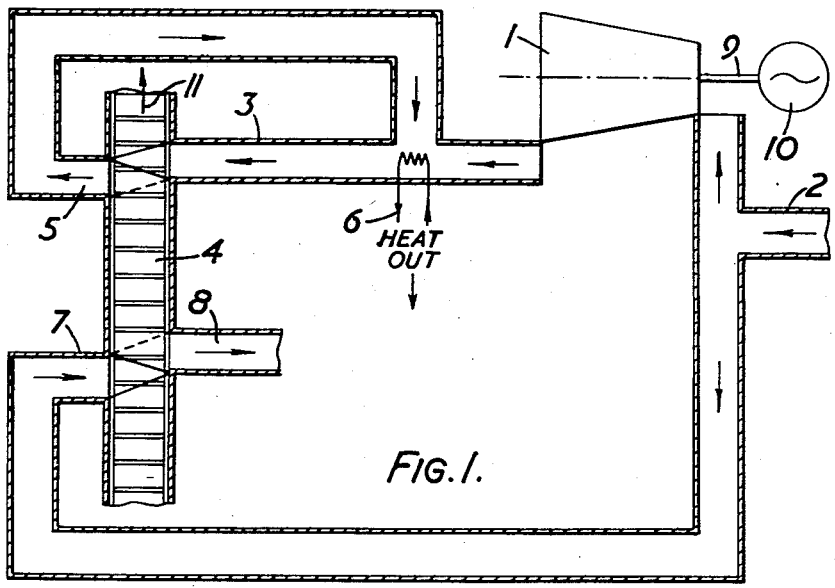

Sept. 20, 1960  D. B. SPALDING  2,952,982
PRESSURE EXCHANGER APPARATUS
Filed Aug. 14, 1956  2 Sheets-Sheet 1

United States Patent Office 2,952,982
Patented Sept. 20, 1960

2,952,982

PRESSURE EXCHANGER APPARATUS

Dudley Brian Spalding, 2 Vineyard Hill Road, Wimbledon, London, England

Filed Aug. 14, 1956, Ser. No. 604,012

Claims priority, application Great Britain Aug. 24, 1955

7 Claims. (Cl. 62—6)

The invention relates to pressure exchanger apparatus.

According to the invention pressure exchanger apparatus comprises cells for the compression and expansion of gas, ducting to lead gas to and from the cells in the region of a heat extraction stage and at a scavenging stage at least, cooling means positioned to cool gas in the said heat extraction stage and means for effecting relative motion between the cells and the ducting, the said heat extraction stage ducting including an inlet duct arranged to introduce gas to the cells at a lower pressure than that of gas introduced at the said scavenging stage.

The scavenging stage may include an inlet duct arranged to introduce gas to the cells at substantially atmospheric pressure, the said heat extraction stage inlet duct being arranged to introduce gas to the cells at a pressure below atmospheric pressure.

The supply of gas at a pressure below atmospheric may be obtained from an internal combustion engine, a gas turbine plant or other heat engine, or a process plant, e.g. exhaust gases from a kiln. Alternatively the pressure exchanger apparatus may include a turbine arranged to receive a supply of gas and to expand it to a pressure below that of gas introduced at the said scavenging stage, the turbine exhaust being connected to the inlet duct of the said heat extraction stage ducting. Power take-off means may be provided at the turbine shaft. The pressure exchanger apparatus is then, in effect, a gas turbine plant operating on the so-called "inverted cycle" in which compression occurs in the cells of a pressure exchanger instead of in a conventional compressor.

The cells of the pressure exchanger apparatus are preferably arranged side by side in the form of a ring of axially extending cells, the cell ring and the ducting being relatively rotatable. The ducting may comprise the said heat extraction stage inlet duct, a heat extraction stage outlet duct, arranged to return gas externally of the cells from the cell ring to the said heat extraction stage inlet duct, and scavenging stage inlet and outlet ducts, arranged to introduce scavenging gas to and to extract scavenged gas from the cells respectively, the said four ducts being arranged with their ends, adjacent the cell ring, spaced apart circumferentially thereof.

The four said ducts may be arranged around the cell ring for communication with each cell in succession in the following cyclic order in the direction of rotation: the scavenging stage inlet duct, the scavenging stage outlet duct, the heat extraction stage outlet duct and the heat extraction stage inlet duct.

The compression of gas introduced into the pressure exchanger cell ring may be effected by timed shock waves produced in the cells. Transfer passages may be provided to reinforce the compression afforded by the shock waves.

The cooling means may be a heat exchanger or a coolant injector, for example, a water spray arranged to inject a coolant into the heat extraction stage ducting or into the cells just before communication with the heat extraction stage ducting. In the latter case there need be no outlet duct at the heat extraction stage.

Figure 2:
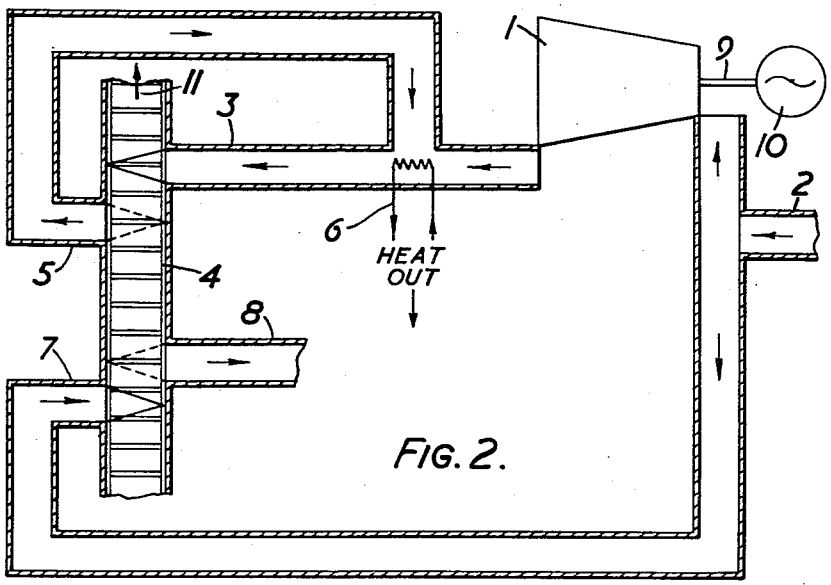
Figure 3:
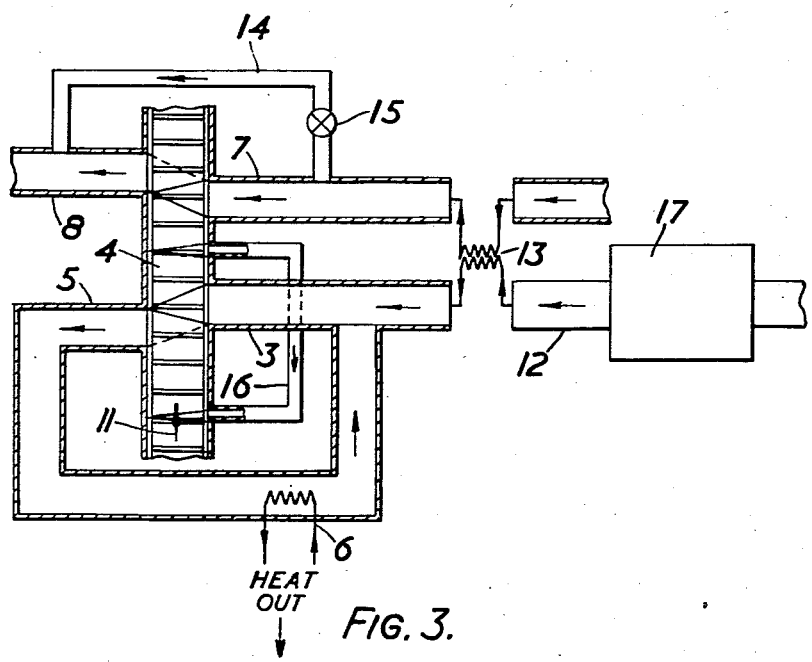

Embodiments of the invention will now be described, by way of example, with reference to the accompanying drawings in which:

Figure 1 is a diagram showing a circumferential development of pressure exchanger apparatus including a gas turbine arranged to deliver gas at a pressure lower than atmospheric pressure. Figure 2 is similar to Figure 1, but shows a modification of the duct arrangement, and Figure 3 is a diagram showing a circumferential development of pressure exchanger apparatus arranged to receive gas at a pressure lower than atmospheric pressure from a gas turbine engine or an internal combustion engine.

Referring firstly to Figure 1, atmospheric gas is introduced to a turbine 1 through duct 2. The gas is expanded in the turbine to a pressure below atmospheric and carried by a heat extraction stage inlet duct 3 to the cell ring 4 of the pressure exchanger. The inlet duct 3 connects externally of the cell ring with a heat extraction stage outlet duct 5 conveying gas at sub-atmospheric pressure from the cell ring 4. The ducts 3 and 5 together with cells of the cell-ring 4 which are communicating at any instant with the duct 5 form a low pressure heat rejection stage for the pressure exchanger. Cooling means, which may be the "cold" path of a heat exchanger and is shown by coil 6, removes heat from the heat rejection stage. The cooling coil 6 is positioned in the inlet duct 3 in the vicinity of the junction of ducts 5 and 3 so that gas approaching the cell ring 4 whether from duct 5 or the turbine 1 is cooled before entering a cell. Scavenging of the cells is performed by gas at atmospheric pressure which is introduced through a scavenging stage inlet duct 7, the scavenged gas being exhausted to atmosphere through a scavenging stage outlet duct 8. The inlet duct 7 is conveniently connected to the turbine inlet duct 2 as shown. The turbine 1 is mounted on a shaft 9 from which useful power is obtained, for example by an electrical machine as shown at 10. The cell ring 4 is rotatable and the ducts 3, 5, 7, 8 are connected to stationary end plates having apertures or ports therein to allow flow between the cells and the ducts. The cell ring 4 may be driven by the turbine 1 or additional driving means such as an electric motor may be provided.

In the following outline of the operation of the plant, mention will be made of shock waves and expansion waves occurring in the cells. In the figures the former have been denoted by full lines and the latter by broken lines.

The operation of the plant is as follows: gas at atmospheric pressure, e.g. air is led into the turbine 1, is expanded to a pressure below atmospheric and is then cooled by cooling coil 6. The cool air at the low pressure is then introduced to the cells of the cell ring 4 moving in the direction indicated by the arrow 11. On entering a cell shock waves will occur as indicated by full lines. The shock waves cause compression of gas in the cell and this compressed gas is carried to the next duct 7. As the pressure of gas in the cell is still lower than atmospheric, gas at atmospheric pressure in the duct 7 will enter the cell and further shock waves will occur. This causes more compression of the gas in the cell, the pressure now being higher than atmospheric. On reaching the duct 8 expansion waves occur and part of the gas in the cell leaves through duct 8 at atmospheric pressure. The ducts 7 and 8 have acted as a scavenging stage, removing from the cell most of the gas that entered at duct 3 and replacing that gas with air drawn in through duct 7. On opening a cell to duct 5 further expansion waves will occur. Entry of gas through duct 3 will then occur.

Gas leaving through duct 5 will be circulated through the cooling coil into duct 3. The circulation of gas through the plant will drive the turbine 1 and useful work can be obtained at the shaft 9.

The turbine 1 may be a turbine of a conventional gas turbine plant, the pressure exchanger and the cooling means would then produce work from the exhaust of the conventional gas turbine plant. The said conventional gas turbine set could be employed to drive the pressure exchanger cell ring.

Although in the preceding description it has been stated that gas at atmospheric pressure, e.g. air, is introduced to the turbine 1 through duct 2 and to the cell ring 4 through duct 7 it is within the scope of the invention to obtain this gas from an intermediate stage of a turbine expanding gas from a higher pressure than atmospheric, the turbine represented by reference 1 being the low pressure stage or stages of such a turbine.

Compression and expansion of gas in the cells has been described herein as being produced by shock and expansion waves respectively caused on the opening and closing of the cells. Transfer passages (not shown in Figure 1) could be employed to augment such compression and expansion.

From Figure 1 it will be seen that at the scavenging stage and at the heat extraction stage, the end plate ports which communicate with the ends of the inlet and outlet ducts 7 and 8, and 3 and 5 respectively, are positioned so close together circumferentially that a compression wave combines with an expansion wave. This has the effect of reducing losses. Scavenging may be made more complete by increasing the port dimensions.

The ports may be spaced apart circumferentially so that expansion and compression waves are separate. Such an arrangement is shown in Figure 2.

For the correct and efficient operation of the pressure exchanger, the opening and closing of cells to the ducts should be correctly timed. That is to say, the circumferential width of the cells, the axial length of the cells and the speed of rotation should all be such that a compression wave set up on opening a cell to an inlet duct will travel through the cell, be reflected at the end of the cell remote from the duct and return to the first end of the cell just as the cell is being closed to the inlet duct. Referring to Figure 2, correctly timed compression waves are shown opposite the inlet ducts 3 and 7. Similarly, an expansion wave set up on opening a cell to an outlet duct should be reflected at the end of the cell remote from the duct and return to the first end of the cell just as the cell is being closed to the outlet duct. Correctly timed expansion waves are shown in Figure 2 opposite the outlet ducts 8 and 5. Where inlet and outlet ducts are so staggered circumferentially as to cause compression and expansion waves to combine, i.e. as shown in Figure 1, correct timing of the opening and closing of cells to the ducts causes a compression or expansion wave set up at one duct to be reflected at a leading or trailing edge of the other duct. For example, in Figure 1, the expansion wave set up on opening a cell to the outlet duct 5 is reflected at the leading edge of the inlet duct 3 and a compression wave set up on opening a cell to the inlet duct 3 is reflected at the trailing edge of the outlet duct 5.

In the foregoing examples, heat may be introduced into the ducts 2 or 7, to heat an ambient air stream, or a stream of gas at substantially atmospheric pressure. Instead of the cooling coil 6 spray nozzles may be employed to inject coolant, e.g. water, directly into the cells just before they communicate with the inlet duct 3. In that case, it would not be necessary to have the outlet duct 5, nor to have external cooling means 6.

Referring to Figure 3, reference 4 represents a pressure exchanger cell ring having low pressure heat extraction stage inlet and outlet ducts 3 and 5 and scavenging inlet and outlet ducts 7 and 8. The low pressure heat extraction stage inlet duct 3 receives exhaust gas at a pressure lower than atmospheric pressure from an internal combustion engine 17, or a gas turbine via a duct 12 and a heat exchanger 13. The heat exchanger transfers heat from fresh air in the scavenging inlet duct 7 to the exhaust gas in the duct 12. In the heat extraction stage ducts there is a cooling coil 6 or a water spray nozzle. The scavenging outlet duct 8 is connected to the inlet duct 7 by a by-pass 14 controlled by a valve 15. Thus a controlled flow of exhaust gas may be recirculated through the scavenging stage. A transfer passage (or passages) 16 is positioned with its ends or ports on either side of the heat extraction stage to interconnect in pairs cells that have communicated with the heat extraction stage ducting and cells that are about to communicate therewith, whereby the compression and expansion of gas in the cells by timed shock and expansion waves are augmented. No detailed description of operation of the plant shown in Figure 3 will be given as the operation is similar to that of the plant shown in Figure 1, except that the transfer passage or passages interconnect cells containing gas at different pressures to assist in the compression and expansion processes. The plant of Figure 3 when used with an internal combustion engine will tend to increase the power output and the scavenging efficiency of that engine. When used with a gas turbine engine the power output of the turbine will tend to be increased.

In some cases, it may be advantageous to cool the gas flowing through the transfer passage, for example by spraying water or other coolant into the passage.

What I claim is:

1. Pressure exchanger apparatus comprising a rotatable ring of open-ended axially extending cells for the compression and expansion of gas, two stationary end plates positioned one adjacent each end of the cells and having apertures to control gas flow through the cells, means to rotate the cell ring, a scavenging stage inlet duct communicating with an aperture in one of said end plates to introduce to cells gas at substantially atmospheric pressure, a scavenging stage outlet duct communicating with an aperture in the other of said end-plates positioned after the scavenging stage inlet aperture considered in the direction of motion of the cells, to extract gas from said cells and to exhaust the extracted gas to atmosphere, a heat extraction stage inlet duct communicating with a second aperture in said other end-plate to introduce to cells gas at a pressure below atmospheric pressure, a heat extraction stage outlet duct communicating with a second aperture in the said one end-plate positioned before the heat extraction inlet aperture considered in the direction of motion of the cells to extract gas from the said cells, a duct connecting the heat extraction stage outlet duct externally of the cell ring with said heat extraction stage inlet duct, a heat exchanger cooling element position in said heat extraction stage inlet duct, a turbine arranged to receive gas at substantially atmospheric pressure, to expand the gas to a pressure below atmospheric pressure and to deliver the expanded gas to said heat extraction stage inlet duct, a connecting duct between said turbine and said heat extraction stage inlet duct and an inlet duct to said turbine.

2. Pressure exchanger apparatus as claimed in claim 1 in which the scavenging stage inlet duct is connected to said turbine inlet duct.

3. Pressure exchanger apparatus comprising a rotatable ring of open-ended axially extending cells for the compression and expansion of gas, two stationary end-plates positioned one adjacent each end of the cells and having apertures to control gas flow through the cells, means to rotate the cell ring, a scavenging stage inlet duct communicating with an aperture in one of said end plates to introduce to cells air at atmospheric pressure, a scavenging stage outlet duct communicating with an aperture in the other of said end plates positioned after the scavenging stage inlet aperture considered in the direction of motion of the cells to extract gas from said cells and to exhaust the extracted gas to atmosphere, a heat extraction stage inlet duct communicating with a second aperture in said one end-plate to introduce to cells gas at a pressure below atmospheric pressure, a heat extraction stage outlet duct communicating with a second aperture in the other said end-plate positioned before the heat extraction stage inlet aperture considered in the direction of motion of the cells to extract gas from said cells, a duct connecting said heat extraction stage outlet duct externally of the cell ring with said heat extraction stage inlet duct, a heat exchanger cooling element positioned in said heat extraction stage inlet duct, a further duct arranged to connect the exhaust manifold of an internal combustion engine to said heat extraction stage inlet duct and a heat exchanger positioned to exchange heat between said further duct and said scavenging stage inlet duct.

4. The combination of pressure exchanger apparatus as claimed in claim 3 and an internal combustion engine whose exhaust manifold is connected to said further duct.

5. Pressure exchanger apparatus including a rotatable ring of open-ended axially extending cells for the compression and expansion of gas, two stationary end-plates positioned one adjacent each end of the cells and having apertures to control gas flow through the cells, one of the apertures in one of the end-plates serving to introduce to cells of the ring gas at substantially atmospheric pressure, another one of the apertures in the other of the said end-plates serving to extract gas from the cells and to exhaust the extracted gas to atmosphere and positioned after the atmospheric pressure gas inlet aperture considered in the direction of motion of the cells, means to rotate the cell ring, a heat extraction stage inlet duct communicating with an aperture in either of the end-plates to introduce to cells of the ring gas at a sub-atmospheric pressure, a heat extraction stage outlet duct to extract gas from the cells communicating with an aperture in the other end-plate before the heat extraction stage inlet aperture considered in the direction of motion of the cells, a duct interconnecting the heat extraction stage outlet duct externally of the cell ring with the heat extraction stage inlet duct, a heat-exchanger cooling element positioned in the heat extraction stage inlet duct, a heat engine arranged to receive gas at substantially atmospheric pressure and to expand the gas to a sub-atmospheric pressure, and a connecting duct between the turbine outlet and the heat extraction stage inlet duct.

6. Pressure exchanger apparatus including a rotatable ring of open-ended axially extending cells for the compression and expansion of gas, two stationary end-plates positioned one adjacent each end of the cells and having apertures therein to control gas flow through the cells, means to rotate the cell ring, a scavenging stage inlet duct communicating with an aperture in one of said end-plates to introduce to cells air at substantially atmospheric pressure, a scavenging stage outlet duct to extract gas from said cells and to exhaust the extracted gas to atmosphere communicating with an aperture in the other of said end-plates positioned after the scavenging stage inlet aperture considered in the direction of motion of the cells, a heat extraction stage inlet duct communicating with a second aperture in said one end-plate to introduce to cells gas at a pressure below atmospheric pressure, a heat extraction stage outlet duct to extract gas from said cells communicating with a second aperture in the other said end-plate positioned before the heat extraction stage inlet aperture considered in the direction of motion of the cells, a duct connecting said heat extraction stage outlet duct externally of the cell ring with said heat extraction stage inlet duct, and a further duct connection external of the cells between the scavenging stage inlet and outlet ducts.

7. Pressure exchanger apparatus including a rotatable ring of open-ended axially extending cells for the compression and expansion of gas, two stationary end-plates positioned one adjacent each end of the cells and having apertures therein to control gas flow through the cells, means to rotate the cell ring, a scavenging stage inlet duct communicating with an aperture in one of said end-plates to introduce to cells air at atmospheric pressure, a scavenging stage outlet duct to extract gas from said cells and to exhaust the extracted gas to atmosphere communicating with an aperture in the other of said end-plates positioned after the scavenging stage inlet aperture considered in the direction of motion of the cells, a heat extraction stage inlet duct communicating with a second aperture in said one end-plate to introduce to cells gas at a pressure below atmospheric pressure, a heat extraction stage outlet to extract gas from said cells communicating with a second aperture in the other said end-plate positioned before the heat extraction stage inlet aperture considered in the direction of motion of the cells, a duct connecting said heat extraction stage outlet duct externally of the cell ring with said heat extraction stage inlet duct, and a further duct connection external of the cells between the scavenging stage inlet and outlet ducts, and an adjustable valve in said further duct connection.

References Cited in the file of this patent

UNITED STATES PATENTS

| | | |
|---|---|---|
| 1,113,682 | Patitz | Oct. 13, 1914 |
| 2,399,394 | Seippel | Apr. 30, 1946 |
| 2,513,010 | Deverall | June 27, 1950 |
| 2,848,871 | Jendrassik | Aug. 26, 1958 |

FOREIGN PATENTS

| | | |
|---|---|---|
| 79,979 | Netherlands | Dec. 15, 1955 |